Oct. 9, 1962

H. I. HENDERSON 3,058,054

METHOD AND APPARATUS FOR CORE ORIENTATION

Filed March 2, 1959

Homer I. Henderson
INVENTOR.

BY Melvin R. Stidham

ATTORNEYS

Homer I. Henderson
INVENTOR.

BY Melvin R. Stidham
ATTORNEYS

Oct. 9, 1962

H. I. HENDERSON 3,058,054

METHOD AND APPARATUS FOR CORE ORIENTATION

Filed March 2, 1959

Homer I. Henderson
INVENTOR.

BY Melvin R. Stidham

ATTORNEYS 3,058,054
METHOD AND APPARATUS FOR CORE ORIENTATION
Homer I. Henderson, Houston, Tex.
(2204 Live Oak, San Angelo, Tex.)
Filed Mar. 2, 1959, Ser. No. 796,468
7 Claims. (Cl. 324—14)

This invention relates to a method and apparatus for core orientation and, more particularly, to a method and apparatus for determining the direction and inclination of a magnetic field in cores taken from bore holes. It is also adapted to measure the magnetic susceptibility of such cores.

In oil well drilling operations it is common practice to make periodic analyses of the sub-surface strata by cutting and retrieving cylindrical cores from the strata penetrated by the bore hole and inspecting and testing the cores brought to the surface. Of course, in making a complete analysis of the core, including a determination of the direction of the stratigraphic dip and the direction in which grains were deposited by sedimentation of the earth's surface composition eons ago, it is necessary to know precisely the azimuth disposition of the core before it was cut from place. However, since the cores are generally cut by rotary drilling operation it is frequently impossible by present methods to tell which diameter of the cylindrical core, when in situ, paralleled the earth's magnetic axis.

Various methods have been suggested for determining the axes of magnetic polarization and anisotropic magnetic susceptibility of cores but such methods usually involve extremely complex and costly equipment, and expenditure of considerable time, and do not produce the results with sufficient accuracy to meet the exacting demands of the geophysicist. Some present devices operate by detecting the movement of a permanent magnet, a static magnetometer, in response to movement of the core adjacent thereto. However, the inertia of the relatively heavy magnet to movement by the weak magnetic field of a well bore core impairs the accuracy of such devices. Other devices provide for the rotation of the core within a coil to induce a weak current and the axis polarity determined by the peaks of the signals induced as represented on an oscilloscope. The strength of the signals induced by such apparatus is necessarily minimized by virtue of the fact that rotation of the core must be at a relatively slow rate to prevent the core from fracturing under centrifugal force. Moreover, precise determination of polarity by analysis of the signal on an oscilloscope is at best, extremely difficult.

It is therefore an object of my invention to produce an apparatus for determining direction of a magnetic field in a core with a maximum degree of accuracy, and a minimum of time and expense.

It is a further object of my invention to provide an apparatus for determining the polarity of the magnetic field in a core while minimizing the effects of the earth's magnetic field or other magnetic fields external of the core.

It is a further object of my invention to measure magnetic susceptibility of a core.

In carrying out my invention I provide a pair of coils which are rotated at the same rate, one being adapted to rotate around the core under analysis and the other being adapted to be rotated about a permanent magnet of known magnetic direction and intensity which is itself mounted for manual rotation. The voltages induced by both coils are transmitted alternately by electronic switching means to the same oscilloscope. Thus, the permanent magnet may be manually rotated until the voltages are in perfect phase alignment indicating that the polar axes of both the magnet and the core are in precise alignment. An indicator scale is provided to show the angular disposition of the permanent magnet and, thus, the angular disposition of the core's magnetic field relative to a fixed point on the apparatus.

Other advantages and objects of my invention will become apparent from the description following when read in connection with the accompanying drawings wherein.

Figure 1:
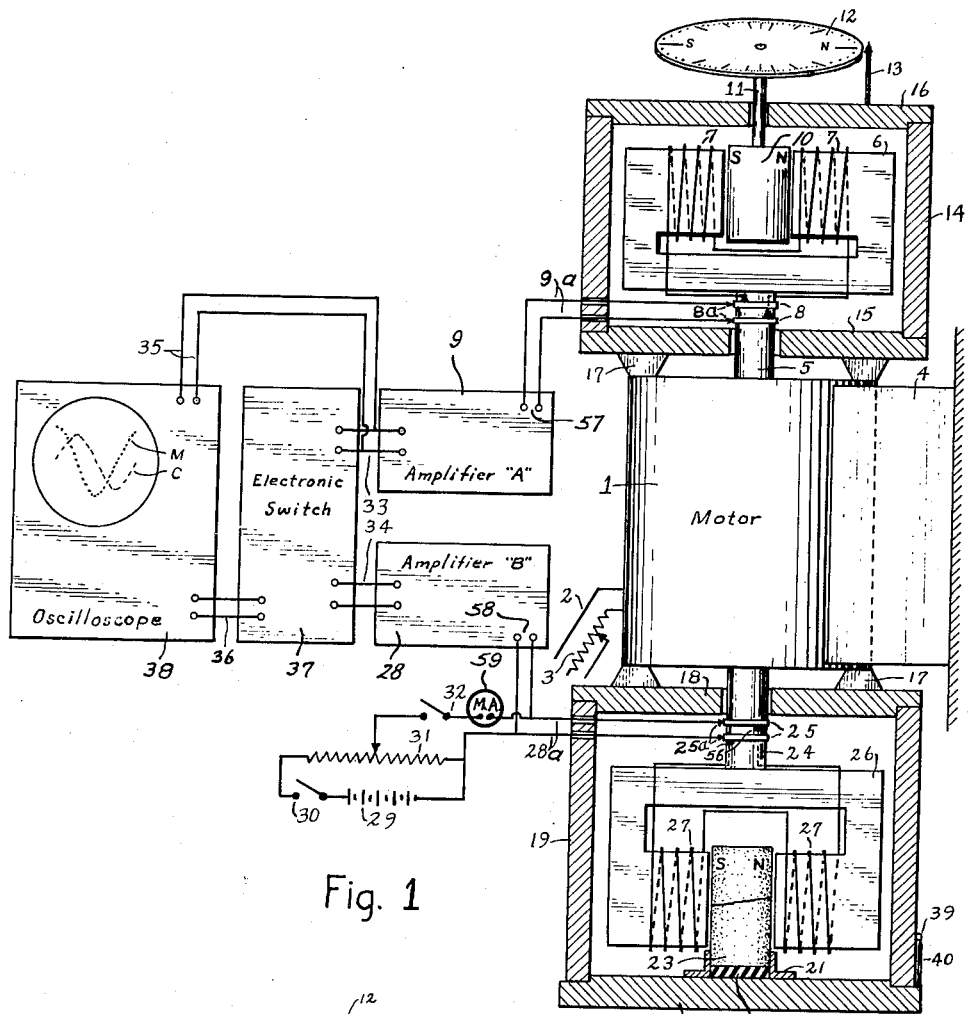
FIG. 1 is a view partially in section and partially schematic showing my apparatus.

If a sample of ferromagnetic material were to be measured for total polarization in a magnetic field, such as the geomagnetic field, there would actually be two fields involved in the analysis, one, the permanent polarization of the sample and, two, the magnetic field surrounding the sample. This may be expressed mathematically by the equation:

$$I = I_R + KH$$

where

I is the total observed polarization;
H is the magnetic field surrounding the sample;
K is the susceptibility constant with respect to unit volume of the material; and
$I_R$ is remnant (permanent) polarization of the sample.

In the main, the remnant polarization of the sample ($I_R$) is most important in geophysical work, and to facilitate its determination, the surrounding magnetic field is reduced to near zero to eliminate the factor KH from consideration.

In those special cases wherein it is desired to measure the susceptibility (K) it is necessary to know the permanent polarization ($I_R$). In many such cases, $I_R$ will be zero and thus may be disregarded mathematically. In those cases wherein it is not known, it may be desirable to reduce it to zero by bringing the sample above the Curie point, or by subjecting it to known methods of cyclic demagnetization. In any event, if the permanent polarization is zero, i.e., if $I_R=0$, or is of a known value, the susceptibility constant K can be determined by measurement of the total observed polarization I, the total magnetic field H and the volume of the sample traversed by the magnetic field.

Referring now to the drawings in detail, my apparatus includes an electric motor 1 to which current is fed from a source (not shown) through conductors 2 including a variable resistance speed control 3. The motor is permanently and securely carried on any suitable stand or bracket shown generally at 4. The motor shaft 5 is preferably of non-magnetic material, such as Monel metal and, on one end thereof is keyed an iron core pick-up coil 6 wound with a conductor 7 terminating at slip rings 8. The slip rings 8 are continuously engaged by brushes 8a so that a voltage induced in the coil conductor 7 will be fed to an amplifier 9 by means of conductors 9a. A permanent magnet 10 is fixed on a non-magnetic rod or shaft 11 to which is also fixed a compass scale 12 readable relative to a pointer 13 fixed on the housing 14 within which the coil 6 and magnet 10 are contained. The magnet 10 is a weakly magnetized cylinder of a material such as "Ceramagnet," that has a high coercive force characteristic and has negligible aging characteristics. This magnet 10, is of the same diameter as the core 23, and its direction of magnetization is parallel to a plane formed by one of its diameters. The housing 14 is a magnetic shield, preferably of soft iron or other magnetically conductive material in order to absorb magnetic flux of external fields, such as the earth's field. The motor shaft 5 extends into the housing 14 through an opening in the bottom wall 15 thereof of the magnetic shield comprising the housing enclosure; and the shaft 11 carrying magnet 10 is journalled on the top wall 16. The housing 14 is supported on feet or spacer 17 preferably of non-magnetic material. A second set of spacers 17 support the upper wall 18 of a second magnetic shield housing 19 including a bottom wall 20 on which is carried non-magnetic core clamps or holders 21 adapted to receive and hold a core 23 recovered from a well bore on non-magnetic support or pedestal 22 of Neolite or the like.

The opposite end of the non-magnetic motor shaft 24 has slip rings 25 to which are fed voltages induced in conductors 27 of a second iron core pick-up coil 26. The iron core pole pieces 26 embrace the rock core 23 so that a voltage will be induced in the conductor 27 having varying maximum and minimum voltage dependent upon the location of poles in the rock core's magnetic field. While I have indicated the polarity of the core for purposes of illustration, it will be understood that the location of the poles relative to the housing 19 is not known when the core is placed.

Brushes 25a engage slip rings 25 so that a voltage induced in coil 27 is fed to a second amplifier 28 by means of a pair of conductors 28a. Thus, as the motor 1 is energized the pick-up coils 7 and 27 will revolve simultaneously at the same rate and in phase agreement, in the magnetic fields of the cylindrical permanent magnet 10 and the core 23 respectively. Therefore, separate voltages of the same frequency will be fed to amplifiers 9 and 28. Because the core itself is not rotated and therefore not subjected to the destructive centrifugal force, the motor may be driven at a high rate of speed, in the order of 6,000 r.p.m. to induce relatively high frequency voltages for more efficient voltage generation and amplification. If desired, the size of the pick-up coils 7 and 27, the number of windings, the strength of the magnet 10, and the air gaps between magnet and coil and core and coil may be varied between the two voltage inductor systems so that the voltages induced by rotation of both coils 27 and 7 about their respective magnet fields will be more nearly equal in magnitude. Of course, the amplitudes of the respective voltages can be separately regulated by adjusting the gain at the amplifiers 9 and 28. These amplifiers are voltage amplifiers of high gain, and of very large input impedance, to prevent any appreciable current in the coils 7 and 27.

The amplified voltages are then fed by conductors 33 and 34 to an electronic switch 37 of conventional design to feed the two voltages alternately through conductors 36 to the plates of an oscilloscope 38. The alternate on-off switching between the two voltages causes both to be projected on the oscilloscope screen alternately, but due to persistence can be viewed simultaneously as dashed line sine curves designated by reference letters M and C in the drawing. The simultaneous projection of both voltage curves facilitates visual comparison of their phase relationship. Unless the polar axis of the core is in precise alignment with that of the magnet the induced voltages will not be in phase alignment and their curves will be non-coextensive, as shown. Then, if indicator scale 12 is turned to vary the radial disposition of the magnet 10, a phase shift will take place in the permanent magnet signal curve M and the curve can be moved horizontally until it is brought into precise phase alignment with that of the core's magnetic field voltage curve C. When this is accomplished the radial disposition of the polar axes of both the magnet 10 and the core 23 will be identical and the direction of the north magnetic pole of the core can be determined by reading the degrees on the scale 12 opposite the indicator arrow 13.

The horizontal sweep of the oscilloscope is controlled by the alternating voltage generated by the magnet 10, as amplified by the amplifier 9. The conductors 35, conduct this signal from the output of the amplifier 9, to the sweep control terminals of the oscilloscope 38, as shown in FIG. 1. As a consequence the sweep of the oscilloscope will always match perfectly the r.p.m. of the motor 1, when the magnet 10, is static.

For the solution of many geological problems it is necessary or desirable to know the magnetic inclination of the rocks in order to compare it with the geomagnetic inclination as it exists now and as it existed when the rock was formed. With my apparatus, the inclination may be determined very readily once the azimuthal direction of the magnetic field is determined as just described.

Figure 5:
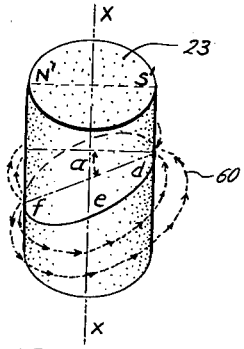
FIG. 5 is an isometric view of a rock core that has been orientated for its azimuthal magnetic axis.
Figure 6:
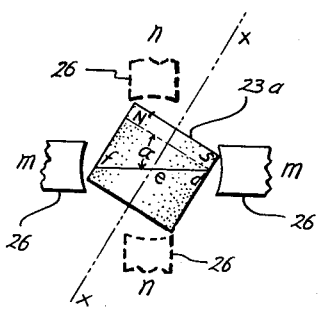
FIG. 6 is a schematic view showing elements of my apparatus as used to determine magnetic inclination.
Figure 7:
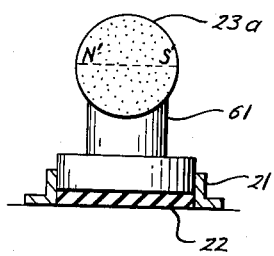
FIG. 7 is an elevation view of a pedestal mounting for a core.

When the direction of the magnetic field is determined, it is desirable to mark it on the core itself as by scribing a line N'—S' as shown in FIG. 5. The core is then reduced in size so that it can be rotated about a diameter within the confines of the pole pieces 26, as shown in FIG. 6. The core segment 23a is then mounted on a pedestal 61 of non-magnetic material held between the pole pieces 26 by the core clamp 21. Assuming the motor shaft 24 to be vertical, the core segment 23a is mounted with both its axis X—X and the scribed line N'—S' indicating azimuthal magnetic axis, disposed horizontally, as shown in FIGS. 6 and 7.

Suppose the geomagnetic inclination lies along the plane indicated by line f—e—d in FIG. 6. Then, the pole pieces 26 will offer a favorable path for the magnetic lines of force in plane f—e—d when disposed in the position M—M (FIG. 6) relative to the core segment 23a. By the same token, the pole pieces are least receptive to flux flow when they are disposed across the plane f—e—d and normal thereto. Thus, the particular angle to the axis X—X of the magnetic axis can be determined in the same manner as was the azimuthal magnetic axis, i.e. by turning magnet 10 until the oscilloscope traces are in phase agreement.

The apparatus just described will effectively and accurately measure the polarity of most cores taken from a well bore. However, it occasionally happens that a core has no discernable remnant magnetic field and, hence, can induce no voltage in the conductor 27. In that event, my apparatus may be used to determine the axis of maximum susceptibility to magnetism which normally has a direct relationship with the azimuth of the earth's magnetic field at the time the individual rock stratum was sedimented. The anisotropic susceptibility is measured by creating in the core magnetic field, which may be approximately one-half gauss, i.e. about the intensity of the earth's magnetic field. The weak magnetic field is created by delivering a weak direct current from source 29 (FIG. 1) through the conductors 28a to the slip rings 25 and the coil 27. Delivery of the direct current can be controlled by switches 30 and 32 and its intensity adjusted by variable resistor 31. The electro-magnetic field thus created will pass through the rock core 23 as the coil 27 rotates thereabout, but it will pass more readily when the direction of the field, i.e. the radial disposition of the coil, coincides with the core's axis of maximum magnetic susceptibility. As the coil core 26 revolves through that axis the alternating voltage induced and recorded at the oscilloscope will rise to a positive maximum as the coil core 27 approaches that axis and fall rapidly to a negative minimum on the other side of that axis. Thus, the axis of anisotropic susceptibility is similarly determined at the oscilloscope by orientations of the magnet 10.

Figure 2:
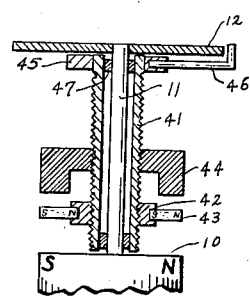
FIG. 2 is a partial section view of a modified form of my apparatus.

It is occasionally desirable to ascertain the magnitude of a rock's remnant magnetic field. With a permanent magnet of known strength and identical in size to the rock core 23 in place, the coils are rotated to induce a voltage. The voltage is amplified at various settings of the amplifier 9 and the corresponding oscilloscope reading is measured for each setting. Thus, with the known magnet, a graph can be plotted for amplifier 9 showing the amplitude of signal for any setting of the amplifier. Then the known magnetic cylinder 10 is placed in the core holder 21 and the lower coils 27 rotated so that a similar graph may be plotted for amplifier 28. When the relative gains of the two amplifiers 9 and 28 are known, the magnitude of a core's magnetic field can be ascertained by equalizing the amplitude of the oscilloscope signal for the rock core and the known magnet 10. The relative gains of the amplifiers will then reflect the relative strengths of the two magnetic fields. It is the generally accepted theory today that when a given rock was formed the earth's magnetic field orientated the rock crystals whereby the axis of maximum magnetic susceptibility paralleled the earth's magnetic field. If the rock crystals had ferromagnetic properties, the rock usually became permanently magnetized and has not since changed its magnetism even though there has been a secular change of the earth's magnetic field. However, there are numerous cases where there has been a change of the rock's remnant magnetism to follow the earth's secular magnetic field drift. In such cases, there is no longer agreement between the rock's axis of maximum susceptibility and the axis of remnant magnetism. When a core of such rock is tested as hereinbefore described, a distorted sine wave pattern will be observed on the oscilloscope, the anisotropic susceptibility causing a bulge to occur therein. In order to facilitate a comparison of the magnetic and maximum susceptibility axes and thereby determine magnetic drift, the modified magnet mounting shown in FIG. 2 is adapted to introduce a second, weak field to duplicate the relationship of the core's magnetic field and susceptibility anisotropy. In FIG. 2, the magnet rod 11 is rotatable within a non-magnetic tube 41 threaded along its length. Threaded onto the tube 41 is an auxiliary magnet carrier 42 on which are fixed a pair of small magnets with opposite poles directed outward. Also threaded onto the tube 41 is a soft iron yoke 44 to function as a low impedance shunt which may be moved toward and away from the magnets 43 to control the intensity of the magnetic field adjacent thereto. The tube 41 may be rotated by means of a head portion 45 carrying a pointer 46 associated with the scale 12. Thus, the rod 11 may be rotated to bring the magnet 11 in coincidence with the relatively strong existing remnant magnetic field in the core and then the tube 41 rotated to duplicate the oscilloscope wave pattern distorted by the anisotropic susceptibility of the core, which distortion magnitude is controlled by means of the shunt 44. When the wave pattern is duplicated insofar as phases are concerned, it is a very easy matter to measure the angle between the magnet 10, and the magnet 43, which will correspond with the angle between the rock core's magnetic field and it's axis of maximum susceptibility.

Figure 3:
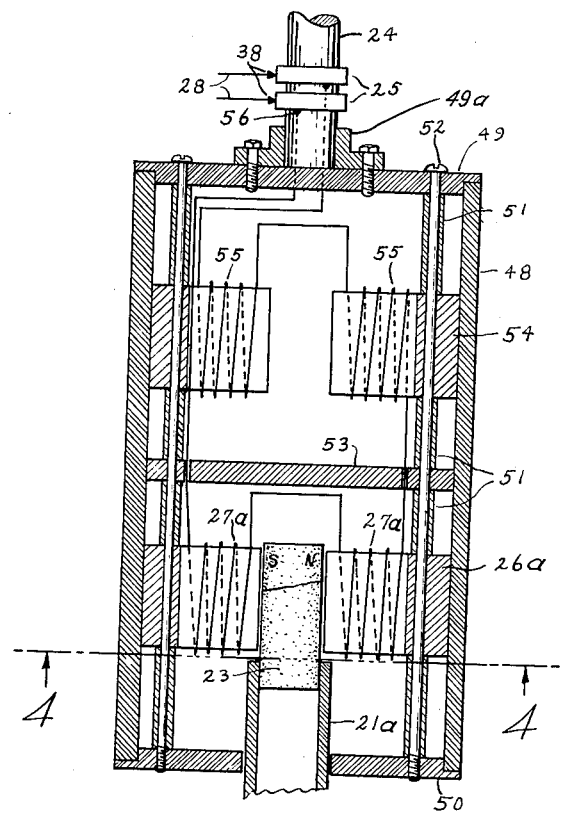
FIG. 3 is a partial section view showing another modification of my apparatus.
Figure 4:
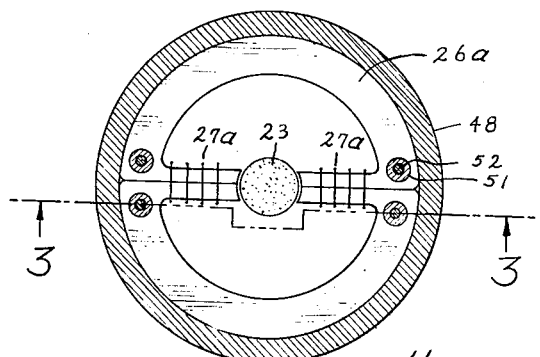
FIG. 4 is a section view taken along line 4—4 of FIG. 3.

Referring now to FIGS. 3 and 4 I have shown a modified form of my invention wherein a cylindrical housing 48 is fixed on one end 24 of the shaft by means of a boss 49a secured on one end 49 of the housing and keyed to the shaft 24. The housing 48 is rigidly constructed with the bolts 52 extending through insulated spacer tubes 51. Carried within the housing so as to rotate therewith is a pick-up coil core 26a including a winding 27a adapted to cooperate with the coil core 26a in the same manner as did coil 27 with coil core 26. Also fixed to the housing 48 is a second pick-up coil core 54 in the same angular disposition as coil core 26a. Thus, voltages induced in the coil conductors 27a and 55 will be of the same frequency. The coils 55 and 27a are identical in number of turns and construction, except they are wound series opposed so that any external magnetic field within the housing 48 will induce a voltage in coil 55 of the same frequency, but 180° out of phase and the effects of magnetic fields other than that of the core C will be nullified. This will permit the extremely high amplification necessitated by the very weakly magnetized cores. Since only the coil 26a is close enough to act in the field of the core C and because of the shielding, the effect of that field will not be cancelled out. This will cancel out the effects of any external magnetic field and permit an accurate determination of the magnetic field across the core. In this embodiment the core 23 is held in a stationary holder 21a of non-magnetic material extending through the housing 48.

Figure 8:
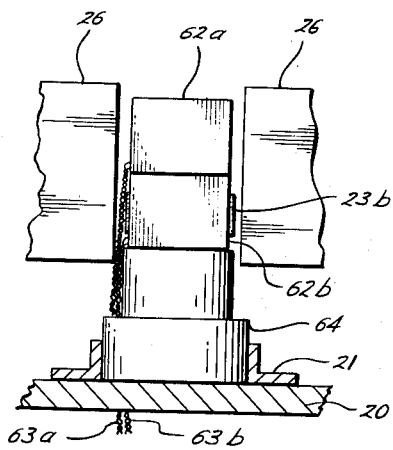
FIGS. 8 and 9 are front and side elevation views respectively of a pedestal mounting two coils for susceptibility measurement.
Figure 9:
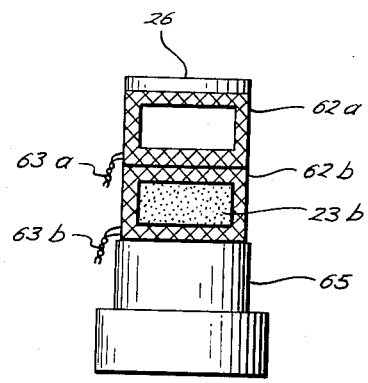
Figure 10:
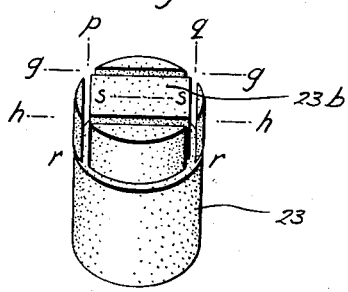
FIG. 10 is an isometric view of a rock core showing kerfs used to obtain a coil-core.

My apparatus can be adapted very readily for use in determining the magnetic susceptibility of certain cores. Two identical coils 62a and 62b of rectangular cross-section having the same large number of turns, are mounted on a non-magnetic pedestal 65 and held in place by core support 21 (FIGS. 8 and 9). After a core 23 has been orientated for anisotropic susceptibility and the axis of maximum susceptibility S—S has been scribed on the core, a plurality of cuts, g, h, p, q, and r are made to form a rectangular parallelepiped 23b which just fits the space of either coil 62a or 62b. As illustrated, the rock core 23b is placed within the coil 62b while the other coil 62a has an air core. Being held in the core support 21, the coils 62a and 62b are centrally mounted. Conductors 9a and 28a are removed from the terminal posts 57, 58 of the amplifiers 9 and 28, respectively and the conductors 63a and 63b of the air and rock core coils are connected to amplifiers 9 and 28, respectively. With the motor rotating the coil pole piece 26, the switches 30 and 32 (FIG. 1) are closed and the potentiometer 31 is adjusted until a signal of convenient size is observed on the oscilloscope screen. A field strength of about ½ oersted is desirable. The milliammeter 59 is provided so that the current value can be duplicated. With a constant value direct current in the coils 27, it will be observed that a uniform magnetic field to which both coils 62a and 62b are subjected, will exist between the pole pieces 26. The voltage generated in each coil is:

$$E = (-)N\frac{d\phi}{dt}$$

where:
$E$ = voltage;
$\phi$ = magnetic flux ($\phi = \mu H A \cos \theta$);
$t$ = time or $$E = (-)N\frac{d\phi}{dt}$$
$$= (-)\frac{d(\mu H A \cos \theta)}{dt} = \mu H A \sin \theta \frac{d\theta}{dt}$$

where:

$N$ = number of turns;
$\mu$ = magnetic permeability;
$H$ = magnetic field;
$A$ = area of coil; and
$\theta$ = angle between the axis of coils and the axis of the pole pieces.

Then:

$$Ea = N\mu aHA \sin\theta \frac{d\theta}{dt}$$

$$Eb = N\mu bHA \sin\theta \frac{d\theta}{dt}$$

where $Ea$ is voltage of the air core coil and $Eb$ is the voltage of the rock core coil. Therefore, $$\frac{Ea}{Eb} = \frac{\mu a}{\mu b} \text{ or } Ea = \left(\frac{\mu a}{\mu b}\right)Eb$$

$$\mu = 1 + 4\pi K$$

where K is the magnetic susceptibility. Therefore, $$K = \frac{\mu - 1}{4\pi}$$

For most practical purposes, the permeability of air is taken as unity. Therefore:

$$\frac{Ea}{Eb} = \frac{1}{\mu b} \text{ or } \frac{Eb}{Ea} = \mu b$$

and:

$$Kb = \frac{\mu b - 1}{4\pi} = \frac{\frac{Eb}{Ea} - 1}{4\pi}$$

$Kb$ can therefore be determined by measuring the voltages generated, as by bringing the oscilloscope traces to equal magnitude and applying comparative amplifier gain. Preferably, an average reading is obtained by moving the rock core from coil 62b to coil 62a and repeating. Determinations can also be made with different current values in the coils 27.

In the application of the foregoing equations, if time is measured from the instant when the angle between the axes of the coils and pole pieces is zero, i.e. $\theta = 0$, then $\theta = 2\pi ft$ where $f$ is the number of revolutions per second. Then $$d\theta = 2\pi f t \, dt$$

$$\frac{d\theta}{dt} = 2\pi f$$

and the equation $$Ea = N\mu aHA \sin\theta \frac{d\theta}{dt}$$

reduces to $$Ea = N\mu aHA \sin 2\pi ft (2\pi f)$$

When $\theta = 90°$ and $\sin 2\pi ft = 1$ the voltage is a maximum and for maximum measurements:

$$Ea = 2\pi f N\mu aHA$$

and $$Eb = 2\pi f N\mu bHA$$

If we let $\mu a = 1$ for the air core coil $$Ea = 2\pi f NHA$$

If we now connect coils 62a and 62b in series bucking and then to amplifier 28 for measurement of magnitude and direction of the composite voltage, we will get a voltage that is dependent upon the susceptibility of the rock sample. If the rock is paramagnetic the voltage $Eb$ will be greater than $Ea$ but if it is diamagnetic $Ea$ will be greater. Thus the character of the rock is ascertained. Most rocks are paramagnetic.

Should the preliminary tests show the rock to be paramagnetic, then $$Eb - Ea = 2\pi f NHA(\mu b - \mu a)$$

and since $2\pi f NHA = Ea$, then $$Eb - Ea = Ea(\mu b - 1)$$

$Ea$ was measured in the first tests and $Eb - Ea$, which we may term $E_p$ is measured, in this series bucking test. Since $$\mu b = 1 + 4\pi Kb$$

$$Eb - Ea = Ea(1 + 4\pi Kb - 1) = E_p$$

or $$Kb = \left(\frac{1}{4\pi}\right)\frac{Ep}{Ea}$$

Should the preliminary tests show the rock to be diamagnetic, then:

$$Ea - Eb = Ea(1 - \mu b)$$

Let $Ea - Eb = Ed$ the voltage measured in the series bucking test, then $$Ed = Ea(1 - 1 + 4\pi Kb)$$

so $$\frac{Ed}{Ea} = 4\pi Kb$$

and $$Kb = \left(\frac{1}{4\pi}\right)\frac{Ed}{Ea}$$

It is of course imperative that the speed of rotation in the first tests and series bucking tests be the same. I prefer to use a synchronous motor driven by a very stable oscillator.

It may also be desired to measure the susceptibility of a rock in planes other than the plane S—S of maximum susceptibility. To do so it is only necessary to cut the rock coil core 23b with its major axis parallel to the plane of desired determination.

Other modifications and improvements will become apparent from the specification but such are within the scope of my invention which is limited only by the claims appended hereto.

Having described my invention I claim:

1. An earth core orientation device comprising
    a core support adapted to hold an earth core with the axis thereof substantially coincidental with a fixed axis and with the surface thereof in random angular disposition,
    a magnetically permeable coil core rotatable about said fixed axis to travel through a circular path closely embracing an earth core in said core support so that said coil core provides a flux path in association therewith,
    a first pick-up coil on said coil core and rotatable therewith to induce a first sine wave voltage in said first pick-up coil,
    a magnet concentrically mounted on a given axis with the polar axis thereof substantially radially disposed,
    a second pick-up coil mounted for rotation about said given axis through a circular path closely embracing said magnet to induce a second sine wave voltage in said second pick-up coil,
    means for revolving the polar axis of said magnet about said given axis to position said polar axis selectively in a chosen angular disposition,
    means for rotating said first and second pick-up coils at a predetermined speed ratio to induce said first and second voltages at the same frequency, and
    analytical means connected to said first and second pick-up coils to represent simultaneously the sine wave characteristics of said first and second voltage and the phase relationship of corresponding characteristics of said first and second voltages.

2. A core orientation device as defined in claim 1 including a source of current, and conductor means connecting said source of current to said first pick-up coil to create a magnetic field across said core.

3. A core orientation device as defined in claim 1 including a third pick-up coil mounted for rotation with said first pick-up coil, said third pick-up coil being connected series opposed to said first pick-up coil and being spaced from said core support to cancel out voltages induced by movement of said first pick-up coil in magnetic fields wholly external of said core.

4. A core orientation device as defined in claim 1 including a second magnet concentrically mounted on said given axis adjacent to said second pick-up coil, means for adjusting the intensity of the magnetic field of said second magnet, and means for revolving the polar axis of said second magnet to a selected angular position.

5. Apparatus for determining the inclination of the magnetic field in a cylindrical core wherein the azimuthal axis of said magnetic field is known comprising, a core pedestal adapted to hold a cylindrical core with the axis thereof and the azimuthal axis of its magnetic field in a horizontal plane, a first pick-up coil mounted for rotation about said pedestal to induce a first sine wave voltage therein, said first pick-up coil being carried on a magnetically permeable horseshoe coil core, a second pick-up coil mounted for rotation about a given axis, a magnet disposed with its polar axis in a radial plane along said given axis whereby rotation of said second pick-up coil induces a second sine wave voltage, means for rotating the poles of said magnet about said given axis to position said magnet in a selected radial disposition, indicator means for determining the radial disposition of the poles of said magnet, means for rotating said first and second pick-up coils at the same rate of speed, and means for representing simultaneously the sine wave characteristics of said first and second voltages for determining the phase relationship of said first and second voltages.

6. An earth core orientation device comprising a rotatable shaft, a non-magnetic core support adapted to hold a core adjacent one end of said shaft with the magnetic poles thereof concentrically arranged about the axis of said shaft though in random azimuthal disposition, a magnetically permeable coil core on said one end of the shaft adapted to embrace said core and provide a flux path in association therewith, a first pick-up coil on said coil core and rotatable therewith about said core to induce a first sine wave voltage in said first pick-up coil, a permanent magnet, mounting means supporting said magnet adjacent the other end of said shaft with the poles thereof concentrically arranged about said axis and in known azimuthal disposition, a second pick-up coil rotatable with said other end of the shaft about said magnet to induce a second sine wave voltage in said second pick-up coil, an analytical device operative to represent the characteristics of a voltage fed thereto, switch means for alternately instantaneously feeding said first and second voltages to said analytical device to provide continuous comparative representation thereof, and means for turning at least one of said support and said mounting means about said axis thereby to bring said first and second voltages into perfect phase relationship.

7. The earth core orientation device defined in claim 6 including a source of current and conductor means connecting said source of current to said first pick-up coil to create a magnetic field through said coil core and across said earth core, said earth core offering maximum capacity for magnetic flux flow along a particular axis of magnetic susceptibility.

References Cited in the file of this patent
UNITED STATES PATENTS
2,260,562    Dillon _____ Oct. 28, 1941